(12) United States Patent
Martono et al.

(10) Patent No.: US 10,057,837 B2
(45) Date of Patent: Aug. 21, 2018

(54) DEVICE IDENTIFICATION USING BANDWIDTH EFFICIENT TECHNIQUES

(71) Applicant: Accenture Global Solutions Limited, Dublin (IE)

(72) Inventors: Christian Martono, Singapore (SG); Trent Mayberry, Singapore (SG); Hiroshi Ochi, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 133 days.

(21) Appl. No.: 15/179,723

(22) Filed: Jun. 10, 2016

(65) Prior Publication Data

US 2017/0359769 A1 Dec. 14, 2017

(51) Int. Cl.
*H04W 4/00* (2018.01)
*H04W 48/10* (2009.01)
(Continued)

(52) U.S. Cl.
CPC .......... *H04W 48/10* (2013.01); *H04B 17/318* (2015.01); *H04L 9/0861* (2013.01); *H04L 12/1886* (2013.01); *H04L 63/0428* (2013.01); *H04L 67/22* (2013.01); *H04W 4/008* (2013.01); *H04W 4/023* (2013.01); *H04W 4/027* (2013.01); *H04W 4/80* (2018.02); *H04W 40/244* (2013.01)

(58) Field of Classification Search
CPC ..... H04W 48/00; H04W 48/08; H04W 48/12; H04W 48/16; H04W 36/00; H04W 36/0033; H04W 36/22; H04W 36/24; H04W 36/32; H04W 36/34; H04W 4/005; H04W 4/008; H04W 4/02; H04W 4/24; H04W 48/005; H04W 40/22; H04W 40/244; H04W 40/246; H04W 40/248
See application file for complete search history.

(56) References Cited

U.S. PATENT DOCUMENTS

2009/0210141 A1* 8/2009 Young .................. G08G 1/0104
701/119
2009/0325571 A1* 12/2009 Wentink ................ H04W 48/16
455/423

(Continued)

OTHER PUBLICATIONS

Cho et al., "Analysis of Latency Performance of Bluetooth Low Energy (BLE) Networks," http://www.ncbi.nlm.nih.gov/pmc/articles/PMC4327007/, Dec. 23, 2014, 14 pages.

(Continued)

*Primary Examiner* — Mohamed Kamara
(74) *Attorney, Agent, or Firm* — Harrity & Harrity, LLP

(57) ABSTRACT

A device may receive, from a beacon device, a first message including a first identifier. The first identifier may be associated with the beacon device. The device may receive, from a user device, a second message including a second identifier. The second identifier may be associated with the user device. The device may determine the second identifier based on the second message and the first identifier. The device may determine an event associated with the second identifier based on the first identifier. The device may provide, to another device, information that identifies the second identifier and the event to permit the other device to identify a displacement trajectory associated with the user device.

20 Claims, 15 Drawing Sheets

(51) Int. Cl.
  *H04W 4/80* (2018.01)
  *H04B 17/318* (2015.01)
  *H04L 9/08* (2006.01)
  *H04L 12/18* (2006.01)
  *H04L 29/06* (2006.01)
  *H04W 4/02* (2018.01)
  *H04L 29/08* (2006.01)
  *H04W 40/24* (2009.01)

(56) References Cited

U.S. PATENT DOCUMENTS

| | | |
|---|---|---|
| 2014/0111380 A1 | 4/2014 | Gibbs et al. |
| 2014/0113560 A1* | 4/2014 | Graube ............ H04B 7/26 455/41.2 |
| 2014/0213176 A1 | 7/2014 | Mendelson |
| 2014/0221004 A1 | 8/2014 | Goldfarb |
| 2015/0112748 A1 | 4/2015 | Kaye et al. |
| 2015/0278867 A1* | 10/2015 | Lerman ............ G06Q 30/0261 705/14.58 |
| 2016/0029160 A1 | 1/2016 | Theurer et al. |
| 2016/0055428 A1 | 2/2016 | Raina et al. |
| 2016/0055690 A1 | 2/2016 | Raina et al. |
| 2016/0092954 A1 | 3/2016 | Bassett et al. |
| 2016/0093184 A1 | 3/2016 | Locke et al. |
| 2016/0095064 A1* | 3/2016 | Li ............ H04W 48/10 370/311 |
| 2016/0142964 A1 | 5/2016 | Todasco et al. |
| 2016/0012655 A1 | 6/2016 | Hanson et al. |
| 2017/0110011 A1* | 4/2017 | Tonguz ............ G08G 1/087 |
| 2017/0301160 A1* | 10/2017 | Somani ............ G07C 9/00079 |

OTHER PUBLICATIONS

Argenox, "A BLE Advertising Primer," http://www.argenox.com/bluetooth-low-energy-ble-v4-0-development/library/a-ble-advertising-primer/, Mar. 30, 2015, 13 pages.

Wikipedia, "Distributed computing—Wikipedia," https://en.wikipedia.org/w/index.php?title=Distributed_computing&oldid=718087723, May 1, 2016, 14 pages.

Extended European Search Report corresponding to EP 17153456.3 dated Jun. 9, 2017, 10 pages.

Australian Search Report corresponding to AU 2017200266 dated Jun. 20, 2017, 7 pages.

* cited by examiner

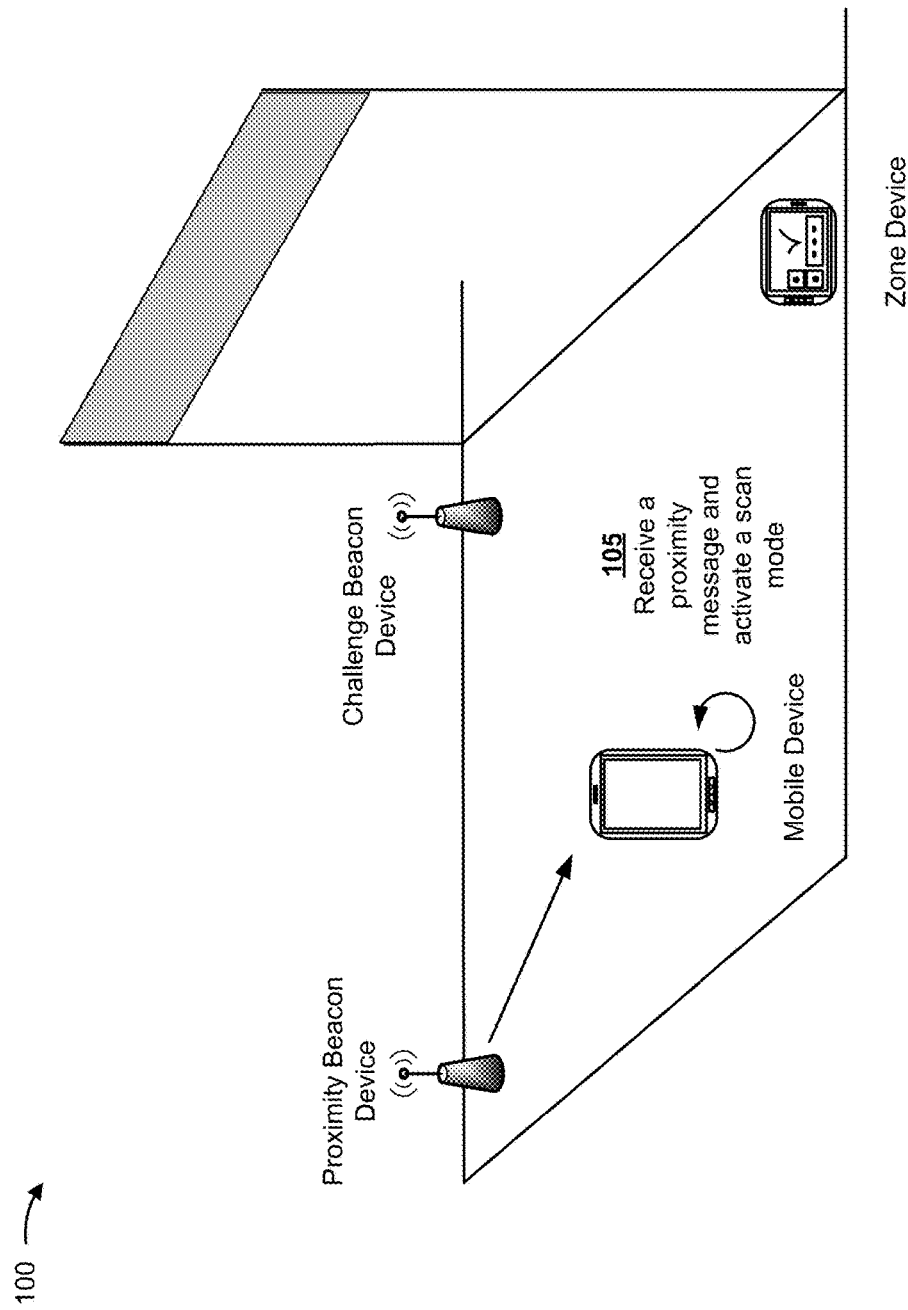

US 10,057,837 B2

DEVICE IDENTIFICATION USING BANDWIDTH EFFICIENT TECHNIQUES

BACKGROUND

A mobile device may broadcast packets to devices around the mobile device. Another device may receive the advertised packet, and may identify the mobile device without establishing a communication link with the mobile device.

SUMMARY

In some possible implementations, a device may include one or more processors. The one or more processors may receive, from a beacon device, a first message including a first identifier. The first identifier may be associated with the beacon device. The one or more processors may receive, from a user device, a second message including a second identifier. The second identifier may be associated with the user device. The one or more processors may determine the second identifier based on the second message and the first identifier. The one or more processors may determine an event associated with the second identifier based on the first identifier. The one or more processors may provide, to another device, information that identifies the second identifier and the event to permit the other device to identify a displacement trajectory associated with the user device.

In some possible implementations, a non-transitory computer readable medium may store instructions. The instructions may cause a processor to receive, from a beacon device, a first message including a first identifier. The instructions may cause the processor to receive, from a user device, a second message including a second identifier. The user device may provide the second message using wireless personal area network advertisement mode signaling. The instructions may cause the processor to determine the second identifier based on the second message and the first identifier. The instructions may cause the processor to determine an event based on the second identifier. The instructions may cause the processor to provide, to another device, information that identifies the second identifier and the event to cause an action to be performed.

In some possible implementations, a method may include receiving, by a device and from a first beacon device, a first message. The method may include activating, by the device, a scan mode based on the first message. The method may include receiving, by the device and from a second beacon device, a second message based on the scan mode. The method may include determining, by the device, a first identifier based on the second message. The first identifier may be associated with the second beacon device. The method may include providing, by the device and to another device, a third message including a second identifier. The second identifier may be associated with the device. The other device may determine the second identifier based on the first identifier. The device may provide the third message to the other device without establishing a communication link with the other device.

BRIEF DESCRIPTION OF THE DRAWINGS

FIGS. 1A-1F are diagrams of an overview of an example implementation described herein;

DETAILED DESCRIPTION

Figure 1B:
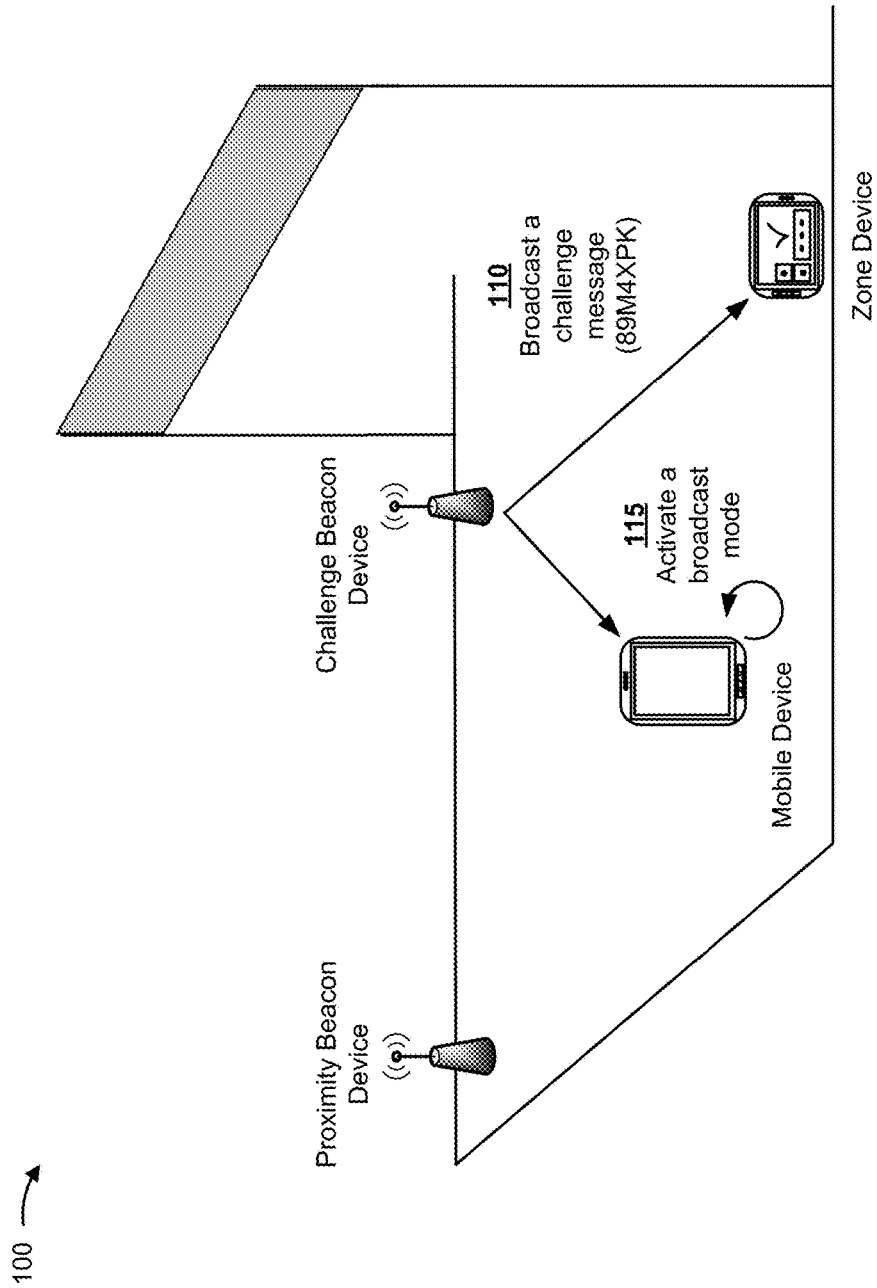

The following detailed description of example implementations refers to the accompanying drawings. The same reference numbers in different drawings may identify the same or similar elements.

In some situations, identification of a device in association with a particular area may be desired. For example, in a shipping scenario, an entity may be required to identify a group of devices that are associated with a particular displacement trajectory. For example, a group of devices may pass through an identification area at a controlled rate and/or in a particular order (e.g., serially via a conveyor belt and/or via other means). In some cases, the entity may utilize an identification technique, such as near-field communication (NFC), radio-frequency identification (RFID), and/or Bluetooth to identify a particular device.

As another example, an entity (e.g., a transportation entity) may screen bags, luggage, or the like, that include devices (e.g., mobile phones, tablet computers, or the like) to determine whether the devices are associated with an identifier (e.g., a passenger name, a confirmation number, etc.) on a ticket at an airport. If the devices pass through an identification area in a controlled manner (e.g., in a particular order and/or at a controlled rate), then an identification device may utilize one of the above techniques to perform the device identification. However, if the devices pass through the identification area in an uncontrolled manner (e.g., in bulk, or at an increased rate), then the identification device may be unable to identify each device based on a reduced amount of time to perform the identification process (e.g., establish a communication link) and/or based on a limited quantity of available bandwidth.

In other situations, identification of a user and/or determination of a displacement trajectory in association with a particular area or areas may be desired. For example, in a transit scenario, a transportation entity may be required to identify a user, assess a fare, and/or control access to a transit station and/or vehicle accordingly. Additionally, the transportation entity may be required to perform the above operations in a quick and efficient manner so as to accommodate a large throughput of users.

In some cases, a user may utilize an NFC device (e.g., an NFC card) and/or an RFID tag to gain access to the transit station and/or provide payment for transportation. However, this method may require that the user carry and use a dedicated device (e.g., the NFC card or RFID tag) when transiting, and may require that the user perform a physical operation (e.g., perform a tap operation in association with a card reader), both of which may prove inconvenient for the user and may impede the throughput of a large quantity of users.

In other cases, a user may utilize a mobile device (e.g., a smart phone) to establish a communication link (e.g., a wireless personal area network communication link, such as a Bluetooth link) with an access device for fare calculation and access purposes. While this method may enable a hands-free user experience, the method may nonetheless require a particular amount of time to establish the communication link (e.g., perform protocol handshaking). Thus, this method may not accommodate a high throughput of users, and may also consume mobile device battery, processor, and/or memory resources based on the additional steps required to establish the communication link.

Implementations described herein may enable a zone device to identify a mobile device based on broadcast signaling which may enable the zone device to identify a mobile device without establishing a communication link with the mobile device. Implementations described herein may enable a mobile device to be identified without requiring that the user perform a physical operation, without requiring that the user utilize a dedicated device, and/or without requiring that a mobile device include a data connection. Implementations described herein may improve convenience and scalability of device identification in high throughput scenarios. Additionally, implementations described herein may alleviate a need of a mobile device to establish a communication link with an access device, and/or may alleviate a need of a mobile device to determine an event associated with a transit scenario and communicate that event to a server device, thereby conserving battery, processor, and/or memory resources of the mobile device.

While some implementations described herein are described in terms of identifying a device and/or a user in association with a transit scenario, implementations described herein may be applied to other user identification scenarios, such as a sporting event scenario, a theme park scenario, or an entertainment scenario (e.g., a concert, a play, a movie, or the like). In practice, these implementations may be used in conjunction with other types of systems that are associated with device identification.

FIGS. 1A-1F are diagrams of an overview of an example implementation 100 described herein. As shown in FIG. 1A, assume that a proximity beacon device (e.g., a Bluetooth Low Energy (BLE) beacon), a challenge beacon device (e.g., a BLE beacon), and a zone device (e.g., a computing device) are located in a particular identification area. Additionally, as shown, assume that a mobile device (e.g., a smart phone) enters the identification area. For example, assume that the mobile device is being transported through the identification area (e.g., via a conveyor, or via another transportation means). As shown by reference number 105, the mobile device may receive a proximity message and may activate a scan mode. For example, the proximity beacon device may broadcast proximity messages, which may cause the mobile device to activate a scan mode to scan for challenge messages (e.g., launch an application associated with the mobile device).

As shown in FIG. 1B, and by reference number 110, the challenge beacon device may broadcast a challenge message. The challenge message may include a unique challenge identifier (e.g., "89M4XPK"). As shown, the zone device may receive the challenge message, and may store the unique challenge identifier. Additionally, as shown by reference number 115, the mobile device may receive the challenge message, and may activate a broadcast mode to broadcast response messages.

Figure 1C:
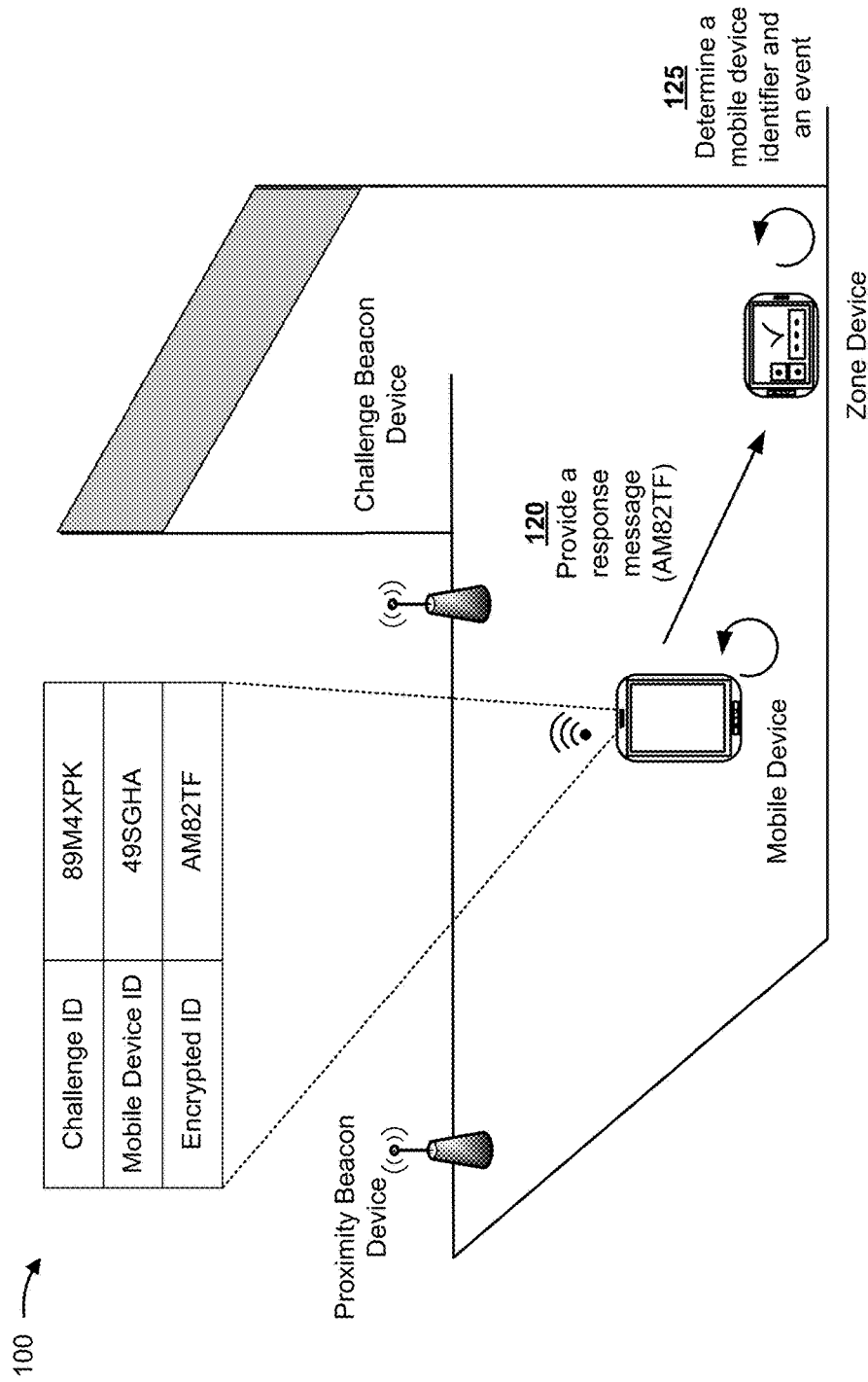

As shown in FIG. 1C, and by reference number 120, the mobile device may provide a response message (e.g., may broadcast a BLE advertisement signal) that includes an encrypted identifier (e.g., "AM82TF"). For example, the mobile device may encrypt a mobile device identifier (e.g., "49SGHA") using the unique challenge identifier and an algorithm (e.g., a cryptographic algorithm) to generate the encrypted identifier. As shown by reference number 125, the zone device may receive the response message and may determine the mobile device identifier and an event. The zone device may use an algorithm (e.g., the same algorithm used by the mobile device) and the unique challenge identifier to decrypt the encrypted identifier. Additionally, the zone device may determine the mobile device identifier. The zone device may correlate the unique challenge identifier with the challenge beacon device (e.g., associated with an entrance of an identification gate), and may determine an event (e.g., that the mobile device has entered the identification gate).

Figure 1D:
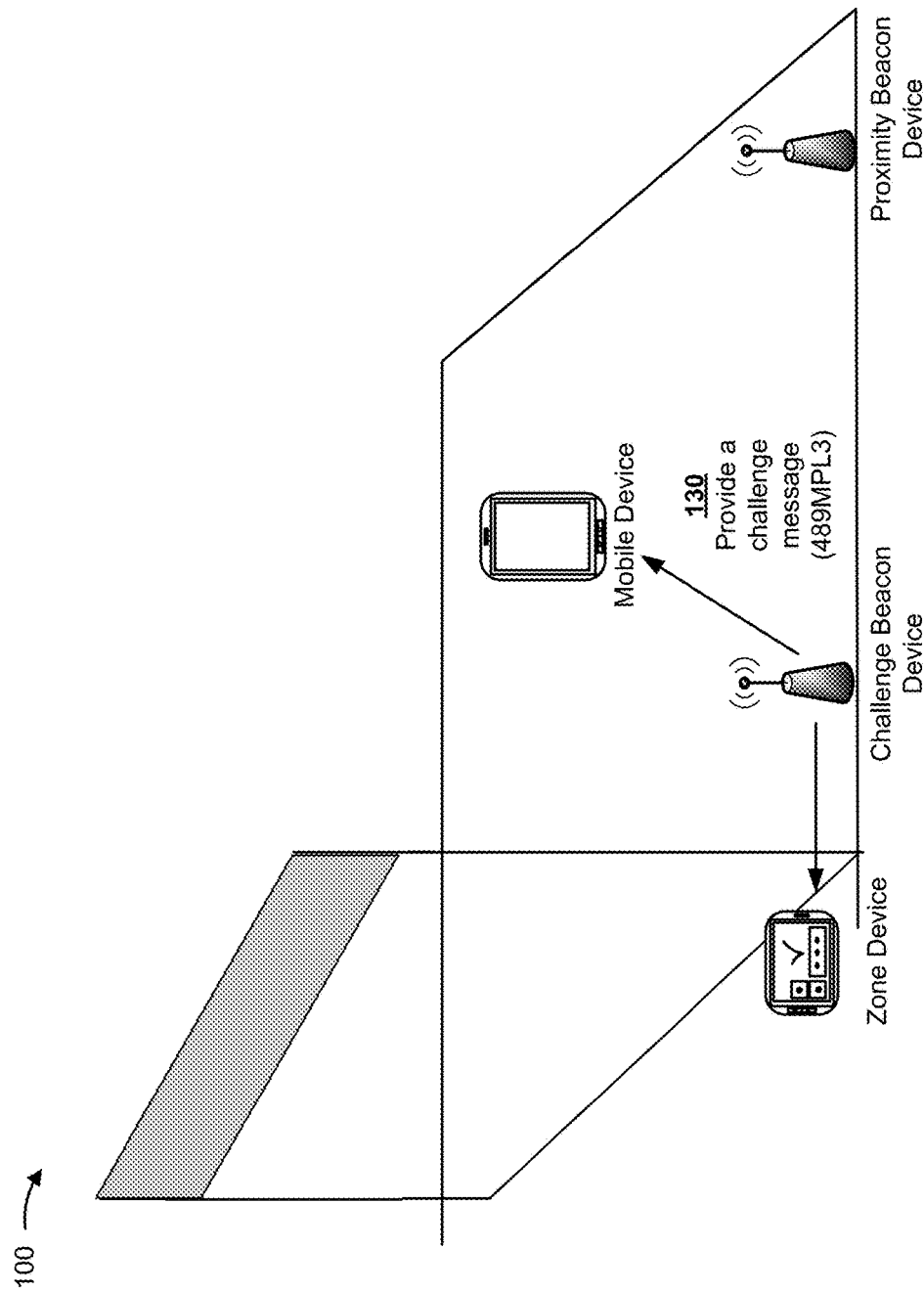

As shown in FIG. 1D, and by reference number 130, another challenge beacon device may provide a challenge message including a unique challenge identifier (e.g., "489MPL3"). As shown, the zone device may receive the challenge message, and may store the unique challenge identifier. Additionally, the mobile device may receive the challenge message, and may generate a response message.

Figure 1E:
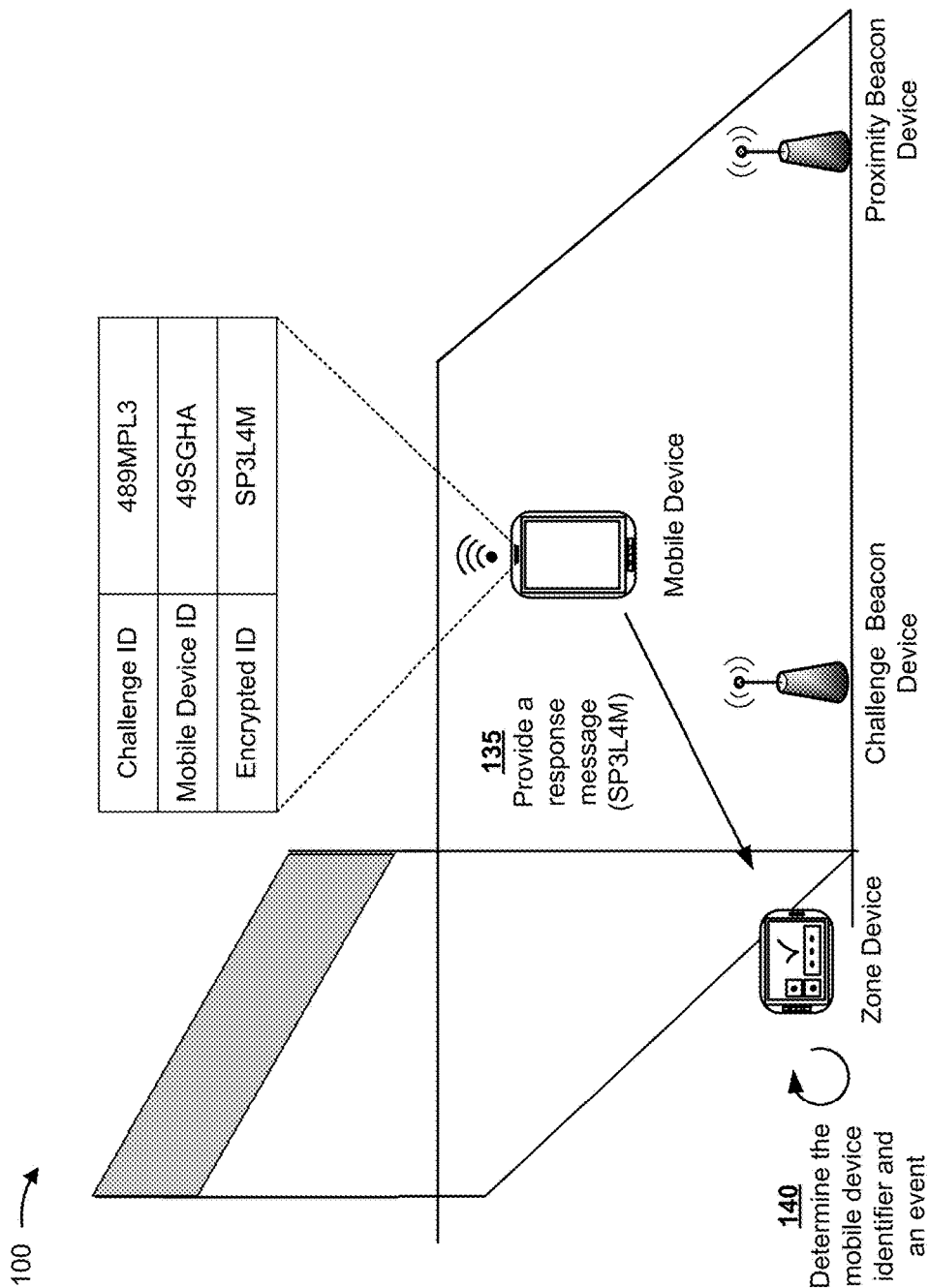

As shown in FIG. 1E, and by reference number 135, the mobile device may encrypt the mobile device identifier using the unique challenge identifier and an algorithm to generate an encrypted identifier (e.g., "SP3L4M"), and may provide the response message to the zone device. As shown by reference number 140, the zone device may decrypt the encrypted identifier, and may determine the mobile device identifier and another event. For example, the zone device may correlate the unique challenge identifier (e.g., "489MPL3") with the challenge beacon device, and may determine an event (e.g., that the mobile device has exited the identification gate).

Figure 1F:
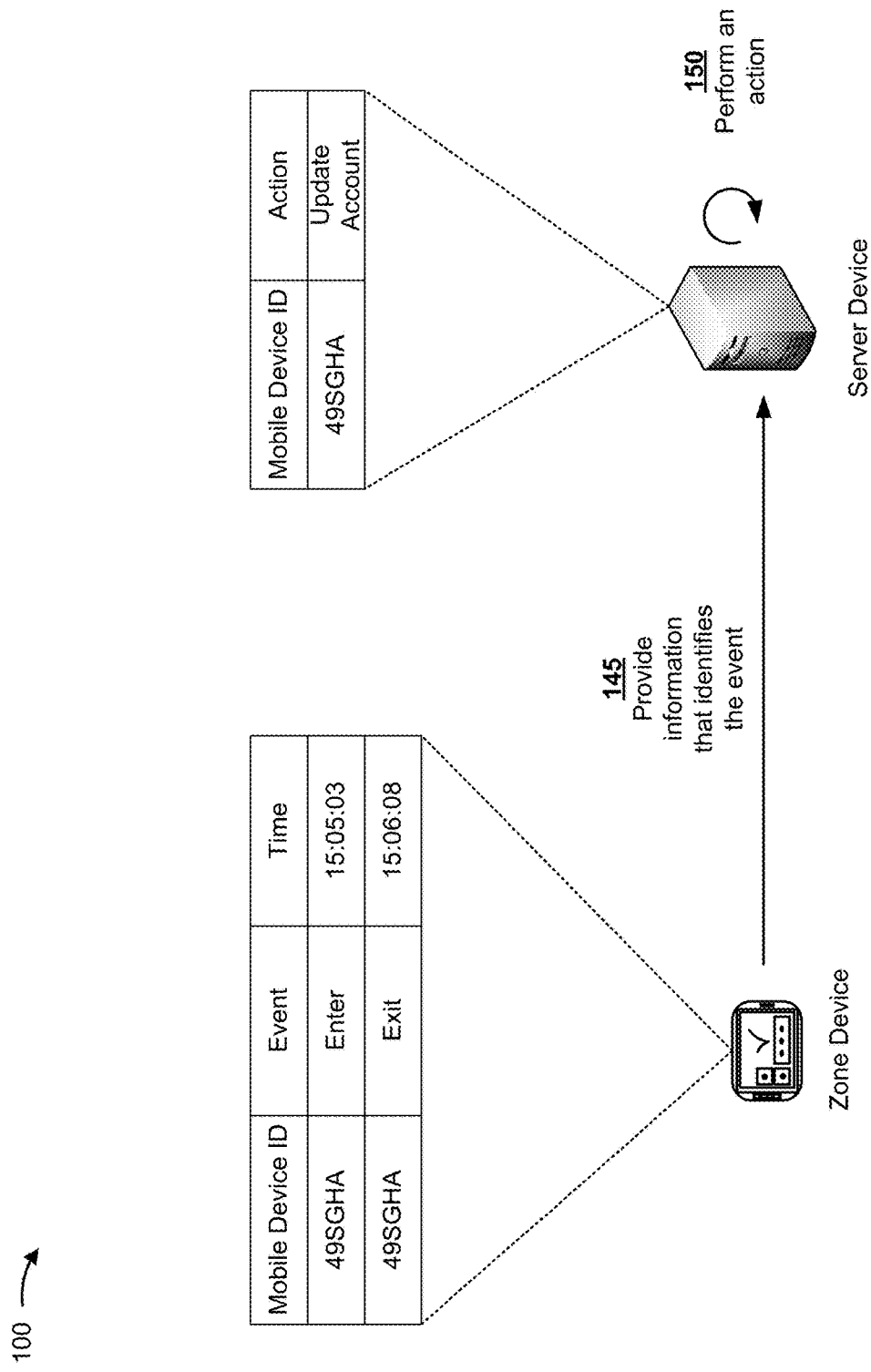

As shown in FIG. 1F, and by reference number 145, the zone device may provide, to a server device (e.g., a server), information that identifies the event(s). As shown, the zone device may provide information that identifies that the mobile device (e.g., the mobile device identifier) is associated with an enter event and an exit event. Additionally, as shown, the zone device may provide context information such as respective times associated with the events. As shown by reference number 150, the server device may identify the mobile device identifier and perform an action (e.g., "update account"). In this way, the zone device may receive broadcast signals from the mobile device, may determine events associated with the mobile device identifier, and may provide information that identifies the events to the server device.

Implementations described herein may enable a zone device to identify a mobile device based on broadcast signaling, thereby enabling the zone device to identify the mobile device without establishing a communication link with the mobile device. In this way, implementations described herein may enable identification of mobile devices in a high throughput scenario. Additionally, implementations described herein may conserve battery, processor, and/or memory resources of a mobile device when providing identification information. Additionally, implementations described herein may enable a mobile device to provide identification information to a zone device without requiring that the mobile device include a data connection (e.g., an internet connection), and without requiring that the mobile device provide identification information to a server device, thereby conserving battery, processor, and/or memory resources of the mobile device.

As indicated above, FIGS. 1A-1F are provided merely as an example. Other examples are possible and may differ from what was described with regard to FIGS. 1A-1F.

Figure 2:
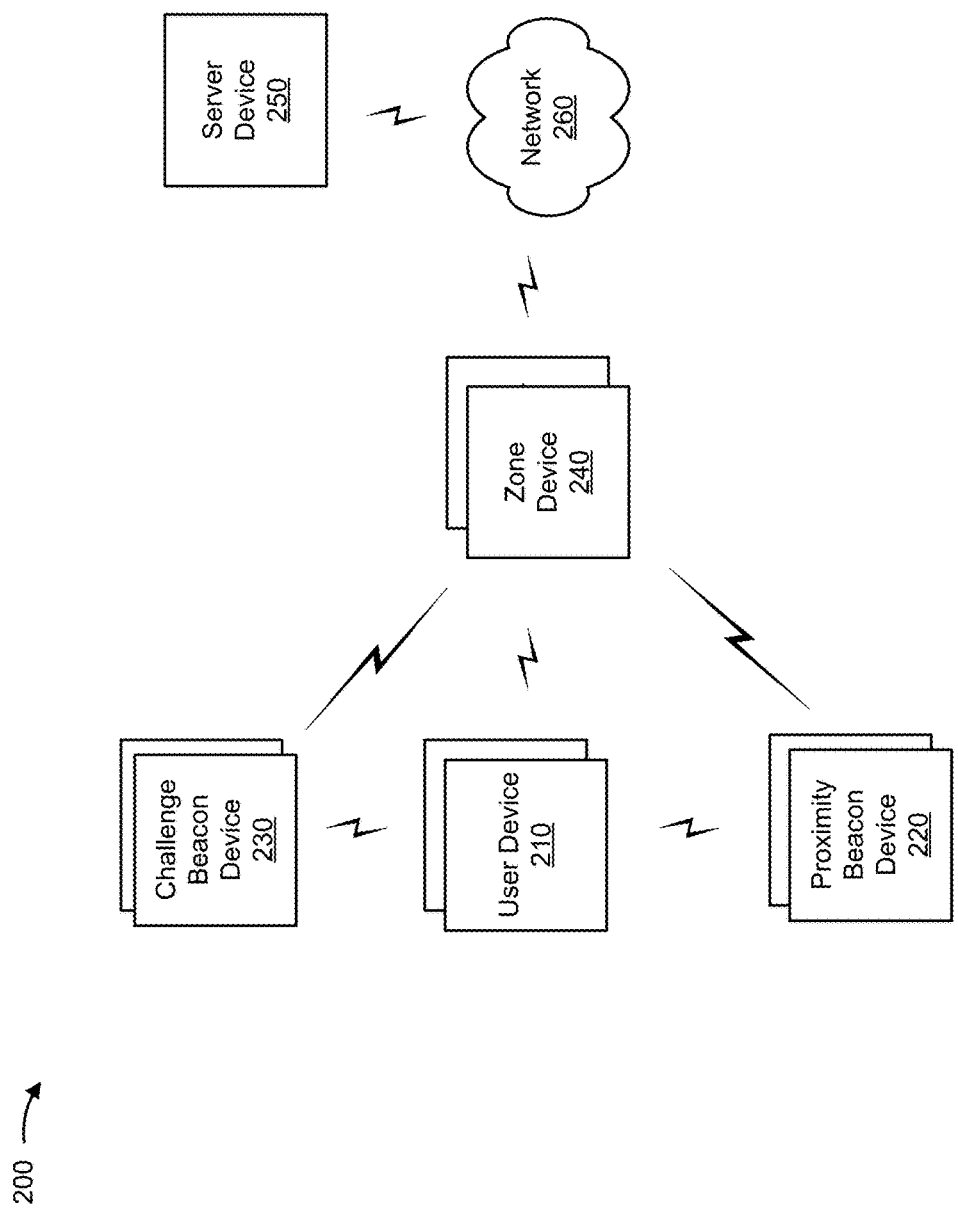
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210 (hereinafter referred to collectively as "user devices 210," and individually as "user device 210"), one or more proximity beacon devices 220 (hereinafter referred to collectively as "proximity beacon devices 220," and individually as "proximity beacon device 220"), one or more challenge beacon devices 230 (hereinafter referred to collectively as "challenge beacon devices 230," and individually as "challenge beacon device 230"), one or more zone devices 240 (hereinafter referred to collectively as "zone devices 240," and individually as "zone device 240"), a server device 250, and a network 260. Devices of environment 200 may interconnect via wired connections, wireless connections, or a combination of wired and wireless connections.

User device 210 includes one or more devices capable of receiving, generating, storing, processing, and/or providing information associated with a user device identifier. For example, user device 210 may include a communication and/or computing device, such as a mobile phone (e.g., a smart phone or a radiotelephone), a laptop computer, a tablet computer, a handheld computer, a gaming device, a wearable communication device (e.g., a smart wristwatch, a pair of smart eyeglasses, a smart band, etc.), or a similar type of device.

Proximity beacon device 220 includes one or more devices capable of receiving, generating, storing, processing, and/or providing information associated with a proximity message. For example, proximity beacon device 220 may include a communication and/or computing device, such as a wireless personal area network beacon (e.g., a Bluetooth beacon or a BLE beacon), an NFC beacon, or the like. In some implementations, proximity beacon device 220 may broadcast proximity messages throughout an identification area, which may cause user device 210 to launch an identification application.

Challenge beacon device 230 includes one or more devices capable of receiving, generating, storing, processing, and/or providing information associated with a challenge message. For example, challenge beacon device 230 may include a communication and/or computing device, such as a wireless personal area network beacon (e.g., a Bluetooth beacon or a BLE beacon), an NFC beacon, or the like. In some implementations, challenge beacon device 230 may broadcast challenge messages, including a unique challenge identifier, throughout an identification area.

Zone device 240 includes one or more devices capable of receiving, generating, storing, processing, and/or providing information associated with a response message and/or an event. For example, zone device 240 may include a computing device, such as a desktop computer, a laptop computer, a tablet computer, a server device, a mobile phone (e.g., a smart phone or a radiotelephone) or a similar type of device. In some implementations, zone device 240 may receive challenge messages and/or response messages, and may identify user device 210 and/or challenge beacon device 230 based on the received messages. In some implementations, zone device 240 may determine an event associated with user device 210, and may provide, to server device 250, information that identifies the event.

Server device 250 includes one or more devices capable of receiving, storing, and/or providing information associated with a user. For example, server device 250 may include a server or a group of servers (e.g., a cloud-based server, an application server, a content server, a host server, a web server, etc.), a desktop computer, or a similar device. In some implementations, server device 250 may receive, from zone device 240, information associated with user device 210 and/or an event, and may perform an action based on the received information (e.g., may assess a fare, may charge an account, may update a profile, etc.).

Network 260 includes one or more wired and/or wireless networks. For example, network 260 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
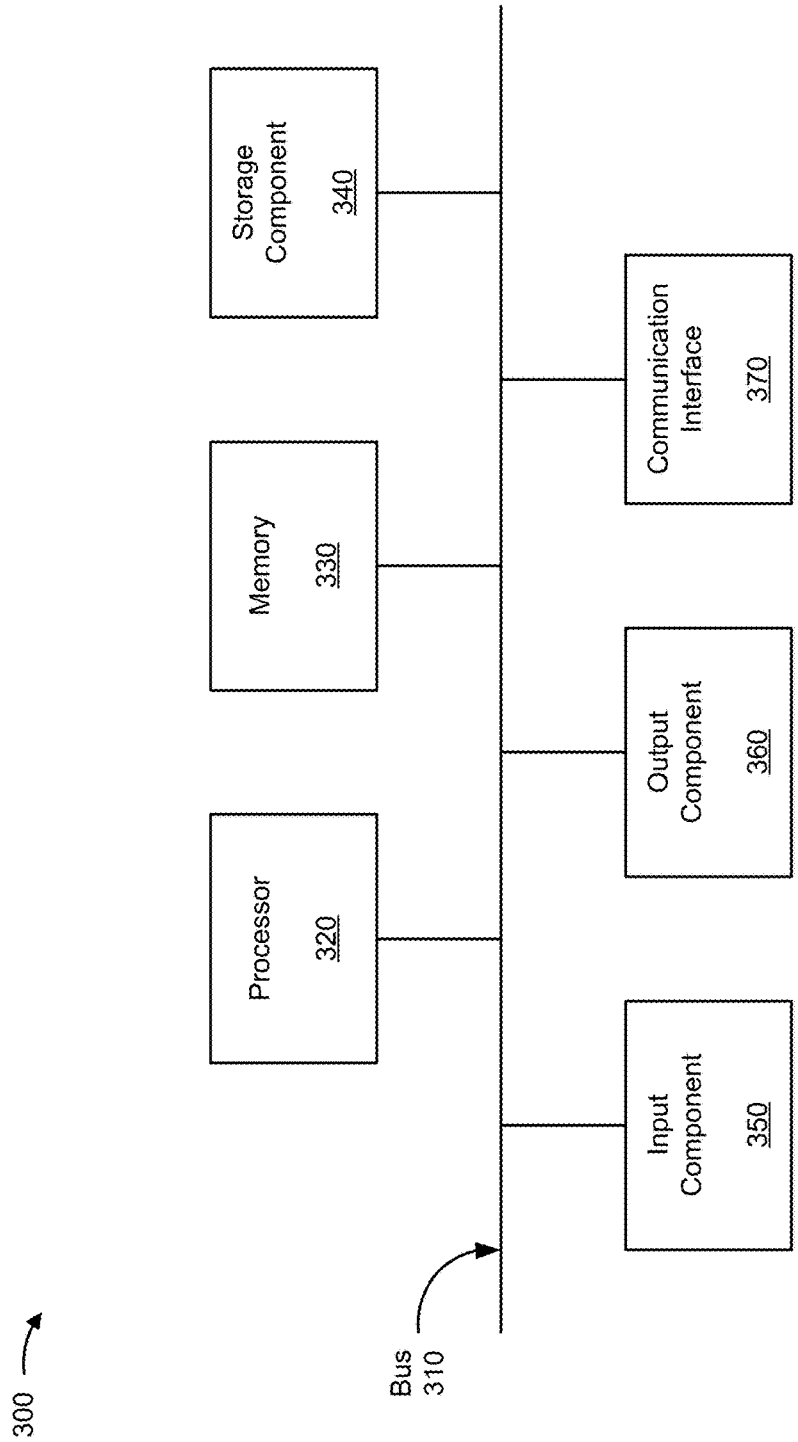
FIG. 3 is a diagram of example components of one or more devices of FIG. 2.

FIG. 3 is a diagram of example components of a device 300. Device 300 may correspond to user device 210, proximity beacon device 220, challenge beacon device 230, zone device 240, and/or server device 250. In some implementations, user device 210, proximity beacon device 220, challenge beacon device 230, zone device 240, and/or server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, a BLE interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
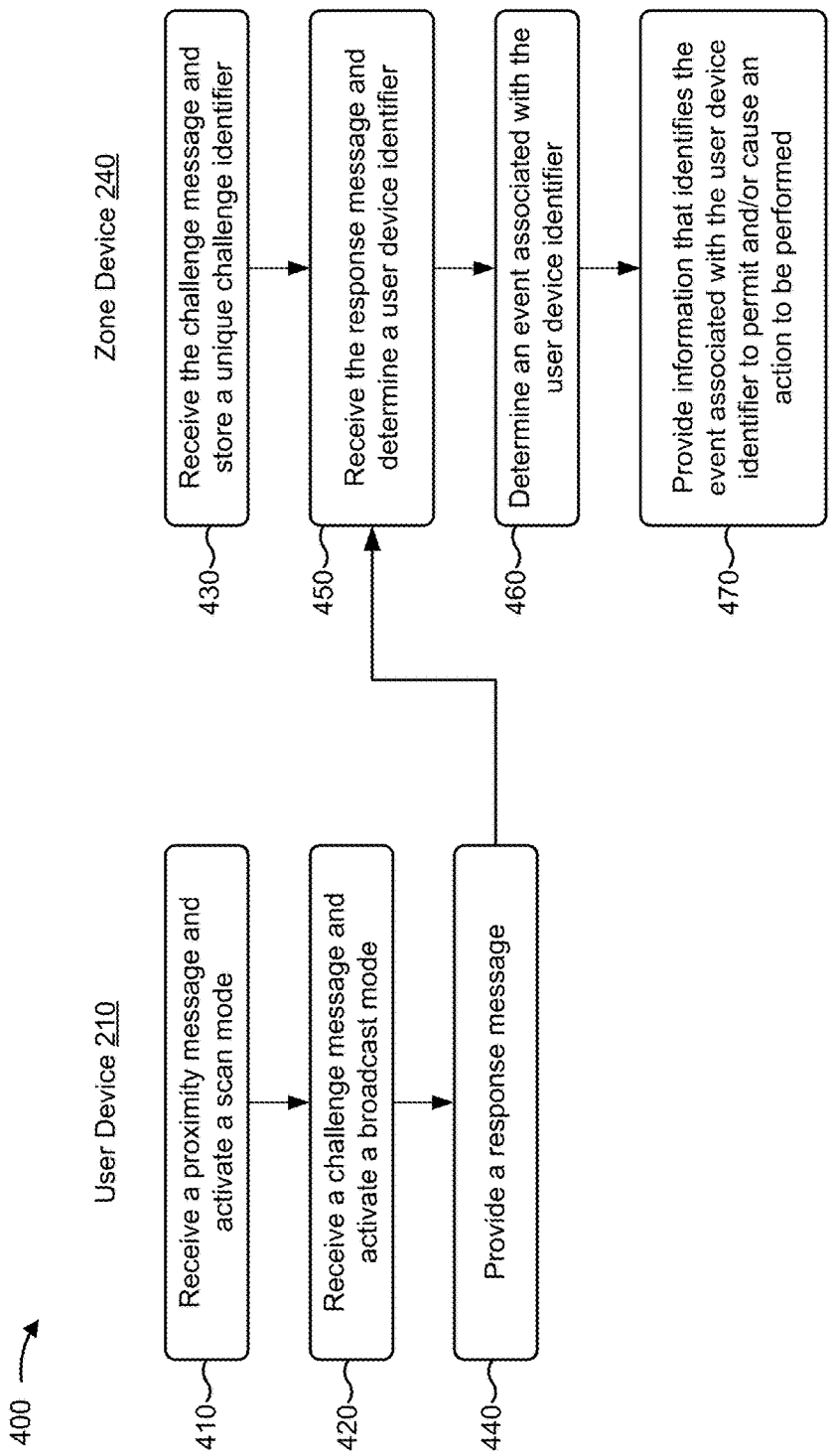
FIG. 4 is a flow chart of an example process for device identification using bandwidth efficient techniques.

FIG. 4 is a flow chart of an example process 400 for device identification using bandwidth efficient techniques. In some implementations, one or more process blocks of FIG. 4 may be performed by user device 210 and/or zone device 240. In some implementations, one or more process blocks of FIG. 4 may be performed by another device or a group of devices separate from or including user device 210 and/or zone device 240, such as proximity beacon device 220, challenge beacon device 230, and/or server device 250.

As shown in FIG. 4, process 400 may include receiving a proximity message and activating a scan mode (block 410). For example, user device 210 may receive, from proximity beacon device 220, a proximity message and may activate a scan mode. In some implementations, proximity beacon device 220 may be associated with an identification area. An identification area may include a geographic location, such as a location associated with a transit scenario (e.g., a train station, a subway station, a bus station, an airport, or the like), and/or a location where access may be controlled and/or monitored, such as an arena, a venue, a store, a restaurant, a school, or the like. Additionally, or alternatively, an identification area may be associated with a vehicle, such as a train, a subway, a bus, a vessel, an airplane, or the like. In some implementations, proximity beacon device 220 may be associated with a particular location of an identification area, such as an entrance, an exit, or the like.

In some implementations, proximity beacon device 220 may provide proximity messages (e.g., may broadcast BLE advertisement mode signals). A proximity message may cause user device 210 to activate a scan mode. Additionally, user device 210 may launch or activate an identification application based on receiving a proximity message from proximity beacon device 220. Additionally, or alternatively, user device 210 may activate a scan mode to scan for challenge messages that may be broadcast by challenge beacon devices 230, as described elsewhere herein. By launching or activating the identification application and/or activating a scan mode based on receiving a proximity message, user device 210 may conserve processor, memory, and/or battery resources by not scanning for challenge messages and/or not broadcasting response messages when user device 210 is not associated with an identification area.

In some implementations, proximity beacon device 220 may provide proximity messages based on a configuration parameter (e.g., a power level, a range, or the like). Additionally, or alternatively, proximity beacon device 220 may provide proximity messages to cover a particular portion of an identification area. In some implementations, user device 210 may receive a proximity message, and may determine whether a value (e.g., a received signal strength indicator (RSSI) value), associated with the proximity message, satisfies a threshold value, may determine whether a proximity of user device 210 to proximity beacon device 220 satisfies a threshold proximity, or the like. Additionally, user device 210 may activate a scan mode based on the value satisfying the threshold value, the proximity satisfying the threshold proximity, or the like.

As further shown in FIG. 4, process 400 may include receiving a challenge message and activating a broadcast mode (block 420). For example, user device 210 may receive, from challenge beacon device 230, a challenge message and may activate a broadcast mode. In some implementations, challenge beacon device 230 may be associated with the identification area, and/or a particular location associated with the identification area (e.g., a gate, an entrance, an exit, or the like). Additionally, challenge beacon device 230 may provide challenge messages (e.g., may broadcast BLE advertisement signals), that may be received by user device 210.

In some implementations, a challenge message may include a unique challenge identifier (e.g., a universally unique identifier (UUID), or the like), such as a string of characters (e.g., alphabetic, numeric, symbols, a combination of alphabetic, numeric, and/or symbols, or the like. Additionally, or alternatively, a challenge message may include a beacon identifier that may identify a particular challenge beacon device 230. Additionally, or alternatively, a challenge message may include a key. As described elsewhere herein, zone device 240 may use a unique challenge identifier to identify user device 210, identify challenge beacon device 230, and/or determine an event associated with user device 210.

In some implementations, challenge beacon device 230 may dynamically change a unique challenge identifier. For example, challenge beacon device 230 may broadcast different unique challenge identifiers based on a time frame, an interval, or the like. Additionally, or alternatively, challenge beacon device 230 may broadcast different unique challenge identifiers based on providing a threshold quantity of challenge messages that include a particular unique challenge identifier. In this way, security associated with a user device identifier of user device 210 may be improved (e.g., because the user device identifier may be encrypted using unique challenge identifiers that are dynamic and/or differ based on location). In some implementations, challenge beacon device 230 may provide challenge messages based on a configuration parameter (e.g., a configured power, a range, or the like).

In some implementations, user device 210 may activate a broadcast mode based on receiving a challenge message, and/or based on a received value (e.g., RSSI value) associated with a challenge message satisfying a threshold value, a proximity of user device 210 to challenge beacon device 230 satisfying a threshold proximity, or the like. In some implementations, user device 210 may activate a broadcast mode and may broadcast response messages that may enable zone device 240 to identify a user device identifier of user device 210, as described elsewhere herein. By activating a broadcast mode based on a value satisfying a threshold value, or the like, user device 210 may conserve processor, memory, battery, and/or network resources by preventing signaling when user device 210 is not located in a particular area of the identification area.

As further shown in FIG. 4, process 400 may include receiving the challenge message and storing a unique challenge identifier (block 430). For example, zone device 240 may receive, from challenge beacon device 230, the challenge message and may store a unique challenge identifier associated with the challenge message. In some implementations, zone device 240 may receive a challenge message and may identify a unique challenge identifier based on the challenge message. Additionally, zone device 240 may relate the unique challenge identifier to a particular challenge beacon device 230 (e.g., based on received information, based on a beacon identifier, or the like). Additionally, zone device 240 may store (e.g., in a data structure) information that identifies the unique challenge identifier and/or relates the unique challenge identifier to the particular challenge beacon device 230. In this way, zone device 240 may receive, from user device 210, a response message, and may determine a user device identifier and/or an event associated with user device 210 based on the stored information, as described below.

As further shown in FIG. 4, process 400 may include providing a response message (block 440). For example, user device 210 may provide, to zone device 240, a response message (e.g., a BLE advertisement signal) based on activating the broadcast mode. In some implementations, the response message may include a user device identifier (e.g., an identifier that identifies user device 210, a user of user device 210, an account associated with user device 210, or the like). Additionally, the response message may include the unique challenge identifier (e.g., associated with challenge beacon device 230). Additionally, or alternatively, the response message may include a key.

In some implementations, user device 210 may encrypt the user device identifier using the unique challenge identifier (e.g., using the unique challenge identifier as a key for an encryption algorithm, a cryptographic algorithm, a challenge-response mechanism, or the like). Additionally, user device 210 and zone device 240 may use the same algorithm when encrypting and/or decrypting the user device identifier using the unique challenge identifier, thereby enabling zone device 240 to determine the user device identifier, as described elsewhere herein. In some implementations, user device 210 may include an identifier (e.g., that identifies challenge beacon device 230) in a response message, and zone device 240 may identify challenge beacon device 230 based on the response message. Additionally, zone device 240 may identify a unique challenge identifier associated with challenge beacon device 230 (e.g., based on stored information), and may decrypt the user device identifier using the unique challenge identifier. By encrypting the user device identifier using the unique challenge identifier, user device 210 may improve security of the user device identifier. For example, the unique challenge identifier may change based on a time interval, and/or may differ between challenge beacon devices 230.

Alternatively, user device 210 may encrypt the user device identifier and/or the unique challenge identifier using a key (e.g., a key shared by user device 210 and zone device 240). For example, user device 210 may combine the user device identifier and the unique challenge identifier, and may encrypt the combined identifier. Alternatively, user device 210 may encrypt the user device identifier and the unique challenge identifier separately.

In some implementations, user device 210 may broadcast response messages for a threshold amount of time (e.g., may activate broadcast mode for the threshold amount of time). For example, user device 210 may broadcast response messages for ten seconds, thirty seconds, or the like. Additionally, or alternatively, user device 210 may broadcast a threshold quantity of response messages. Additionally, or alternatively, user device 210 may broadcast response messages based on receiving additional challenge messages from challenge beacon device 230, and/or based on receiving proximity messages from proximity beacon device 220. For example, user device 210 may determine that user device 210 is located within and/or nearby the identification area, and may broadcast response messages based on being located within and/or nearby the identification area.

In some implementations, user device 210 may broadcast response messages at a particular time interval (e.g., every 10 ms, 25 ms, 30 ms, etc.). Additionally, or alternatively, user device 210 may adjust a time interval between providing response messages. For example, user device 210 may provide a first response message, may provide a second response message 10 milliseconds after the first response message, may provide a third response message 20 milliseconds after the second response message, and so on. In this way, user device 210 may reduce a quantity of collisions with other response messages provided by other user devices 210. For example, assume that a particular quantity of user devices 210 are associated with the identification area and are broadcasting response messages. In this case, zone device 240 may fail to receive particular response messages based on collisions. By adjusting a time interval between response messages, user device 210 may reduce a quantity of response message collisions, thereby conserving battery, processor, and/or memory resources of user device 210 and/or zone device 240, and/or conserving network resources.

In some implementations, user device 210 may receive an additional challenge message from another challenge beacon device 230 associated with the identification area, and may provide another response message based on the additional challenge message. Additionally, or alternatively, user device 210 may receive an additional challenge message from a particular challenge beacon device 230, and may provide another response message based on the additional challenge message.

As further shown in FIG. 4, process 400 may include receiving the response message and determining a user device identifier (block 450), and determining an event associated with the user device identifier (block 460). For example, zone device 240 may receive, from user device 210, the response message, and may determine a user device identifier based on the response message. In some implementations, zone device 240 may decrypt the response message using the unique challenge identifier and an algorithm (e.g., the same algorithm used by user device 210 to encrypt the response message), and may identify the user device identifier.

In some implementations, zone device 240 may determine an event associated with the user device identifier. In some implementations, an event may include a movement of user device 210 in association with the identification area, an association of user device 210 with a particular area of the identification area, or the like. For example, an event may include an entry of user device 210 through a ticketing gate, an exit of user device 210 through a ticketing gate, or the like. Additionally, or alternatively, an event may include a duration of time in which user device 210 is associated with one or more identification areas.

In some implementations, zone device 240 may determine an event associated with user device 210 based on an identifier associated with challenge beacon device 230 (e.g., a unique challenge identifier, or the like). For example, zone device 240 may decrypt an encrypted identifier using a particular unique challenge identifier. Additionally, zone device 240 may identify a particular challenge beacon device 230 based on the unique challenge identifier (e.g., may identify challenge beacon device 230 based on stored information). For example, zone device 240 may identify a unique challenge identifier based on a response message, and may correlate the unique challenge identifier with a particular challenge beacon device 230 (e.g., a challenge beacon device 230 associated with an entrance to a ticketing gate). In this case, zone device 240 may determine that a user entered through a ticketing gate based on the unique challenge identifier.

In some implementations, zone device 240 may receive multiple response messages that include multiple encrypted identifiers (e.g., user device identifiers that were encrypted using various unique challenge identifiers), and may determine multiple events based on the response messages. For example, assume that a user moves through an entrance and an exit associated with a ticketing gate. Further, assume that a first challenge beacon device 230 is associated with the entrance of the ticketing gate, and a second challenge beacon device 230 is associated with the exit of the ticketing gate. In this case, user device 210 may provide a response message that includes a first encrypted identifier (e.g., the user device identifier encrypted using a first unique challenge identifier associated with the first challenge beacon device 230), and may provide another response message that includes a second encrypted identifier (e.g., the user device identifier encrypted using a second unique challenge identifier associated with the second challenge beacon device 230). Additionally, zone device 240 may receive the response messages, and may determine an entrance event and an exit event based on the response messages.

In some implementations, zone device 240 may determine an event based on a response message and context information. For example, context information may include a time, a date, a location (e.g., based on GPS coordinates), a velocity, an acceleration, an odometer value, a speedometer value, etc. As an example, assume that zone device 240 is associated with a vehicle (e.g., a bus). In this case, zone device 240 may receive context information associated with the vehicle (e.g., an odometer reading, a GPS coordinate, a velocity, or the like), and may determine an event based on the context information.

For example, assume that a user enters a vehicle at a particular location. In this case, user device 210 may provide a response message based on the user entering the vehicle, and zone device 240 may determine an entrance event based on the response message. Additionally, zone device 240 may correlate the entrance event with context information (e.g., a time, an odometer reading, a location, etc.). Additionally, assume the user exits the vehicle at another location. In this case, user device 210 may provide another response message based on the user exiting the vehicle, and zone device 240 may determine an exit event based on the response message. Additionally, user device 210 may correlate the exit event with additional context information and may compare context information associated with the entrance event and context information associated with the exit event.

In some implementations, zone device 240 may determine an event based on information received from other zone devices 240. For example, assume that multiple zone devices 240 are associated with an identification area. In this case, user device 210 may broadcast a response message, and each zone device 240 may receive the response message. Additionally, each zone device 240 may determine a value associated with the response message (e.g., an RSSI value), and may provide the value to a particular zone device 240. In some implementations, the particular zone device 240 may receive the values, and may determine a position (or positions) of user device 210 in association with the identification area based on the values (e.g., based on performing a triangulation-based calculation). In this way, zone device 240 may more accurately determine an event associated with a user device identifier (e.g., may more accurately determine a movement of a user in association with the identification area).

In some implementations, zone device 240 may receive, from another device such as an analysis device (e.g., a video analysis device, or the like), information that identifies a quantity of users that are associated with the identification area. For example, zone device 240 may receive information that identifies that a particular quantity of users entered through a ticketing gate for a particular time frame, or the like. Additionally, zone device 240 may compare the information and information identifying a quantity of user device identifiers (e.g., determined by zone device 240 for the particular time frame). In some implementations, zone device 240 may determine a discrepancy between a quantity of identified users (e.g., identified by the analysis system) and a quantity of user device identifiers identified by zone device 240, thereby indicating that particular users did not provide identification information. Additionally, zone device 240 may provide a message to another device that identifies the discrepancy, thereby enabling a user (e.g., an enforcement officer) to perform an audit.

As further shown in FIG. 4, process 400 may include providing information that identifies the event associated with the user device identifier to permit and/or cause an action to be performed (block 470). For example, zone device 240 may provide, to server device 250, information that identifies an event associated with a user device identifier to permit and/or cause server device 250 to perform an action. In some implementations, server device 250 may store validation rules and/or may process events associated with user device 210 (e.g., based on a user device identifier). For example, server device 250 may charge an account associated with user device 210, may update a profile associated with user device 210, or the like. In some implementations, sever device 250 may receive, from a service provider system (e.g., another server device, or the like), location information associated with user device 210. Additionally, server device 250 may use the location information to identify a location associated with user device 210. Additionally, server device 250 may compare the location information and information associated with the identification area. For example, server device 250 may validate that user device 210 is associated with the identification area. Additionally, server device 250 may charge an account based on the validation.

In some implementations, zone device 240 may provide information that identifies an event associated with the user device identifier to permit server device 250 to identify a displacement trajectory associated with user device 210. A displacement trajectory may include a travel trajectory between a first location and a second location. For example, a displacement trajectory may include a travel trajectory between an entry location and an exit location. As an example, assume that user device 210 is associated with an event at a first location (e.g., an entry to a transit station), and is associated with an event at a second location (e.g., an exit associated with another transit station). In this case, server device 250 may identify a displacement trajectory, such as a travel route, of user device 210 based on the events.

As another example, server device 250 may identify a displacement trajectory of user device 210 in association with a particular identification area. For example, server device 250 may determine a displacement trajectory of user device 210 is association with an entrance and an exit of a transit station, or the like. Additionally, server device 250 may perform an action (e.g., charge an account) based on the displacement trajectory.

In some implementations, zone device 240 may provide information that identifies an event based on determining the event. Additionally, or alternatively, zone device 240 may provide information that identifies multiple events based on determining that the events are associated with a particular sequence. For example, assume that a user is located near a particular challenge beacon device 230 (e.g., associated with an entrance to a ticketing gate), but does not enter through the ticketing gate. In this case, user device 210 may receive, from challenge beacon device 230, a challenge message, and may provide a response message to zone device 240. Thus, zone device 240 may determine an event (e.g., an entrance event), despite the user not actually entering the ticketing gate. Assume that zone device 240 does not determine a corresponding event (e.g., an exit event). In this case, zone device 240 may not provide information that identifies the event. Alternatively, zone device 240 may provide information that identifies the event based on receiving another response message (e.g., associated with an exit event). Thus, zone device 240 may provide, to server device 250, information that identifies an entrance event and an exit event (e.g., in a particular sequence) based on determining the particular sequence of events, which may enable more accurate event identification (e.g., when the user actually enters through the ticketing gate).

As another example, assume that a user enters a vehicle (e.g., a bus). In this case, user device 210 may receive, from challenge beacon device 230, a challenge message, and may provide a response message to zone device 240. Zone device 240 may determine an event, such as that the user has entered the vehicle, and may determine context information (e.g., a time, a location, an odometer reading, etc.). Additionally, assume that the user remains in the vehicle for a particular amount of time. In this case, user device 210 may provide a particular quantity of response messages to zone device 240, and zone device 240 may determine additional events (e.g., indicating that the user is still inside the vehicle). Additionally, the user may exit the vehicle, and user device 210 may fail to be within proximity of zone device 240. Additionally, zone device 240 may determine that a particular amount of time has elapsed (e.g., without receiving a response message from user device 210), and may determine an event (e.g., an exit event) based on the particular amount of time (e.g., because zone device 240 fails to receive response messages).

Additionally, zone device 240 may determine an event (e.g., an exit event) based on the response message. Alternatively, zone device 240 may fail to receive a response message from user device 210 (e.g., a response message that indicates that user device 210 is still within the vehicle), and may determine an event (e.g., an exit event). In either case, zone device 240 may provide, to server device 250, information that identifies multiple events (e.g., an enter event and an exit event) based on determining the multiple events, thereby enabling server device 250 to, for example, calculate a fare.

In some implementations, zone device 240 may provide information that identifies an event based on receiving a particular quantity of response messages, based on determining a threshold quantity of events, based on a time interval, or the like. Additionally, or alternatively, zone device 240 may store information that identifies events (e.g., may buffer events), and may provide the information to server device 250. For example, assume that zone device 240 is associated with an intermittent network connection. As an example, zone device 240 may be associated with a vehicle. In this case, zone device 240 may store information that identifies events, and may provide the information based on establishing a network connection.

In some implementations, server device 250 may provide, to user device 210, information that identifies that an action was performed (e.g., a user account was charged). Additionally, user device 210 may provide, for display via a user interface, information that identifies that user device 210 was identified and/or that an action was performed by server device 250. In this way, user device 210 may provide information for display that may enable validation (e.g., by an enforcement officer).

Implementations described herein may enable zone device 240 to identify user device 210 without establishing a communication link with user device 210. Thus, implementations described herein may enable user identification in a high throughput area in a secure and convenient manner. Implementations described herein may enable an action to be performed based on an event associated with user device 210 without requiring that user device 210 provide information that identifies the event to server device 250, thereby conserving battery, processor, and/or memory resources of user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
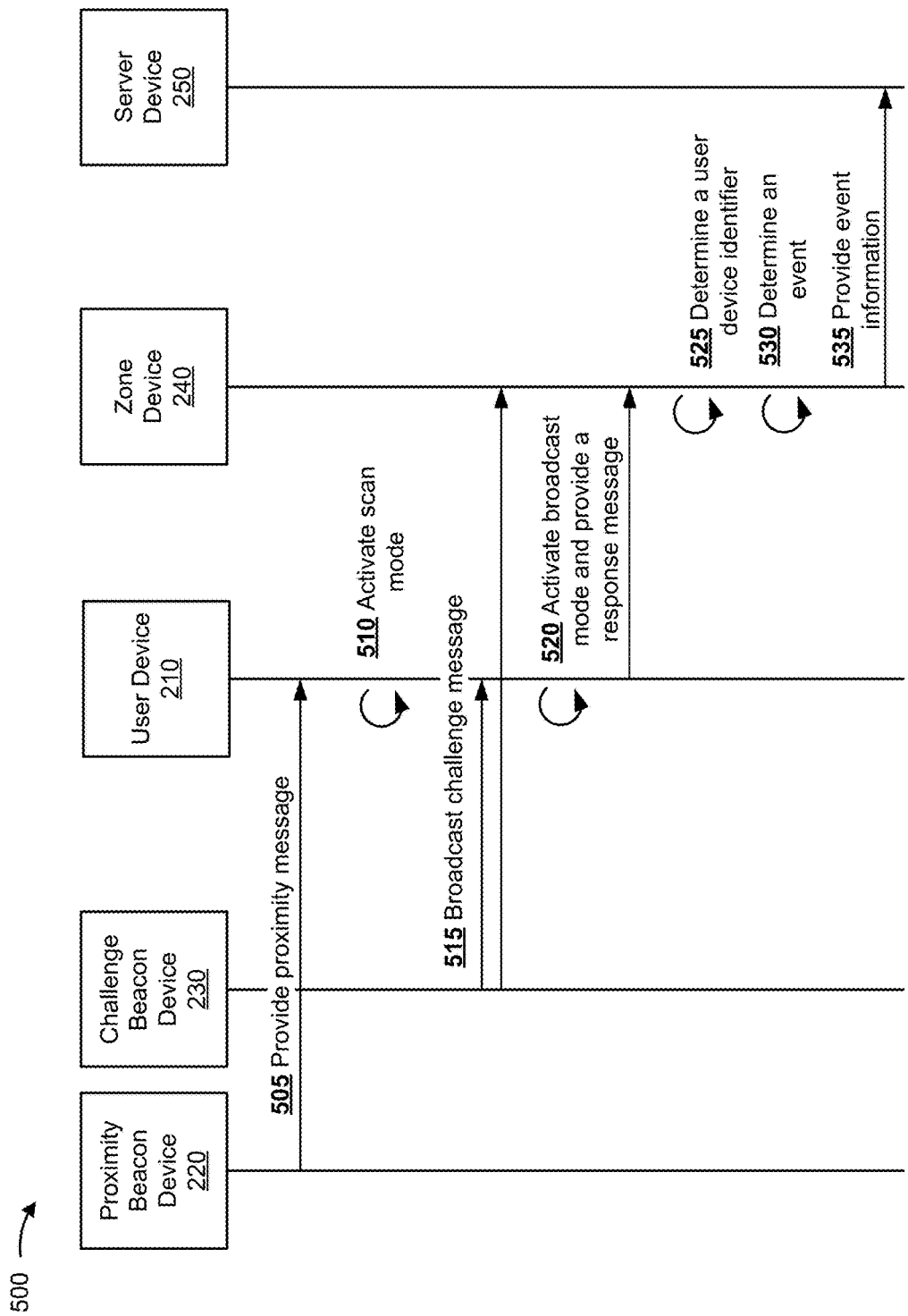
FIG. 5 is an example interaction diagram of operations capable of being performed by one or more devices of FIG. 2.

FIG. 5 is an interaction diagram of an example interaction 500 of example operations capable of being performed by one or more devices of FIG. 2. As shown in FIG. 5, and by reference number 505, proximity beacon device 220 may provide, to user device 210, a proximity message that may cause user device 210 to launch or activate an identification application. As shown by reference number 510, user device 210 may activate a scan mode based on the proximity message. For example, user device 210 may launch or activate the identification application and may scan for broadcast challenge messages. As shown by reference number 515, challenge beacon device 230 may broadcast a challenge message, which may include a unique challenge identifier. As shown, zone device 240 may receive the challenge message, may identify the unique challenge identifier, and may store the unique challenge identifier. As further shown, user device 210 may receive the challenge message, and may identify the unique challenge identifier.

As shown by reference number 520, user device 210 may activate a broadcast mode based on the challenge message, and may provide a response message. For example, user device 210 may broadcast (e.g., broadcast BLE advertisement signals) response messages that include the user device identifier. For example, user device 210 may encrypt the user device identifier (e.g., using the unique challenge identifier and an encryption algorithm) to generate an encrypted identifier.

As shown by reference number 525, zone device 240 may determine a user device identifier. For example, zone device 240 may receive the response message, and may decrypt the encrypted identifier (e.g., using the unique challenge identifier and the encryption algorithm). As shown by reference number 530, zone device 240 may determine an event associated with the user device identifier. For example, zone device 240 may determine the unique challenge identifier, and may identify challenge beacon device 230 that is associated with the unique challenge identifier (e.g., based on stored information). Additionally, zone device 240 may determine an event based on the particular challenge beacon device 230 that is associated with the unique challenge identifier (e.g., challenge beacon device 230 may be associated with a ticketing gate entrance).

As shown by reference number 535, zone device 240 may provide, to server device 250, information that identifies the event and the user device identifier associated with the event. Server device 250 may perform an action based on the information, such as, for example, charging an account associated with user device 210.

While a particular series of operations and/or interactions have been described above with regard to FIG. 5, the order of operation and/or interactions may be modified in other implementations. Further, non-dependent operations may be performed in parallel.

Figure 6A:
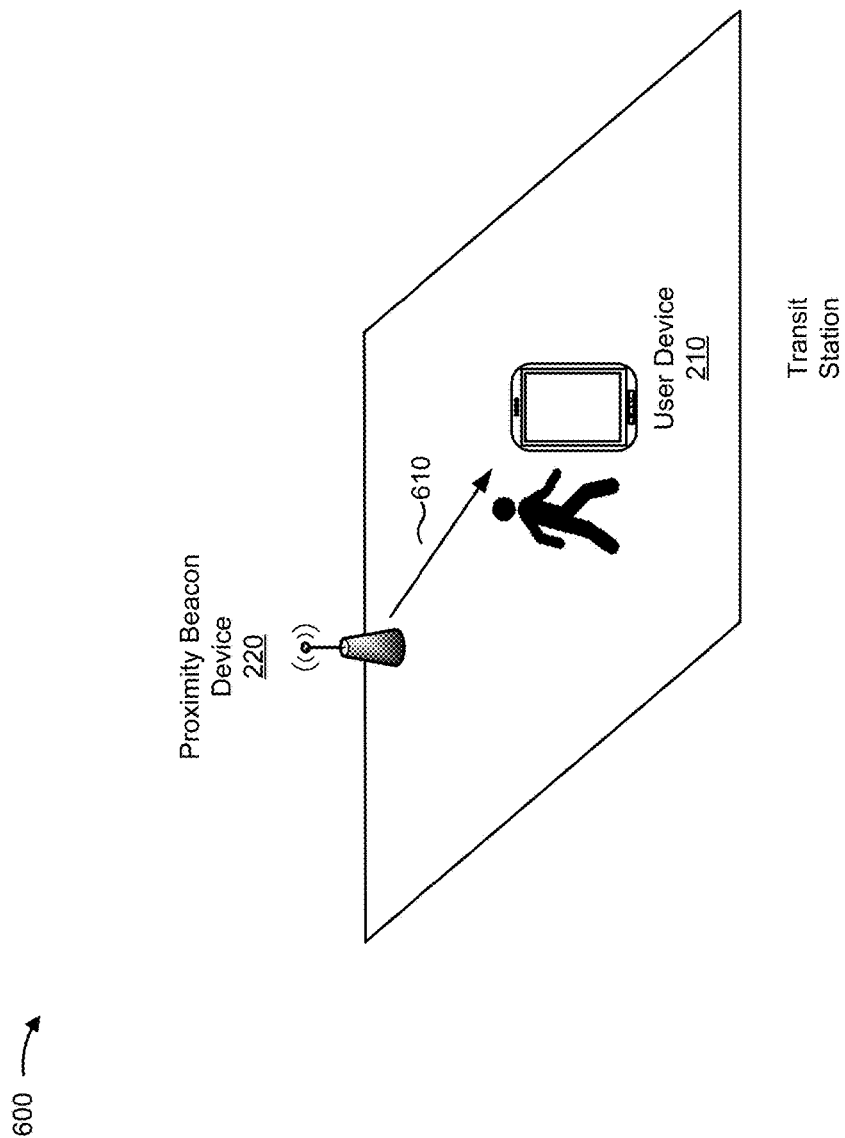
FIGS. 6A-6C are diagrams of an example implementation relating to the example process shown in FIG. 4.
Figure 6B:
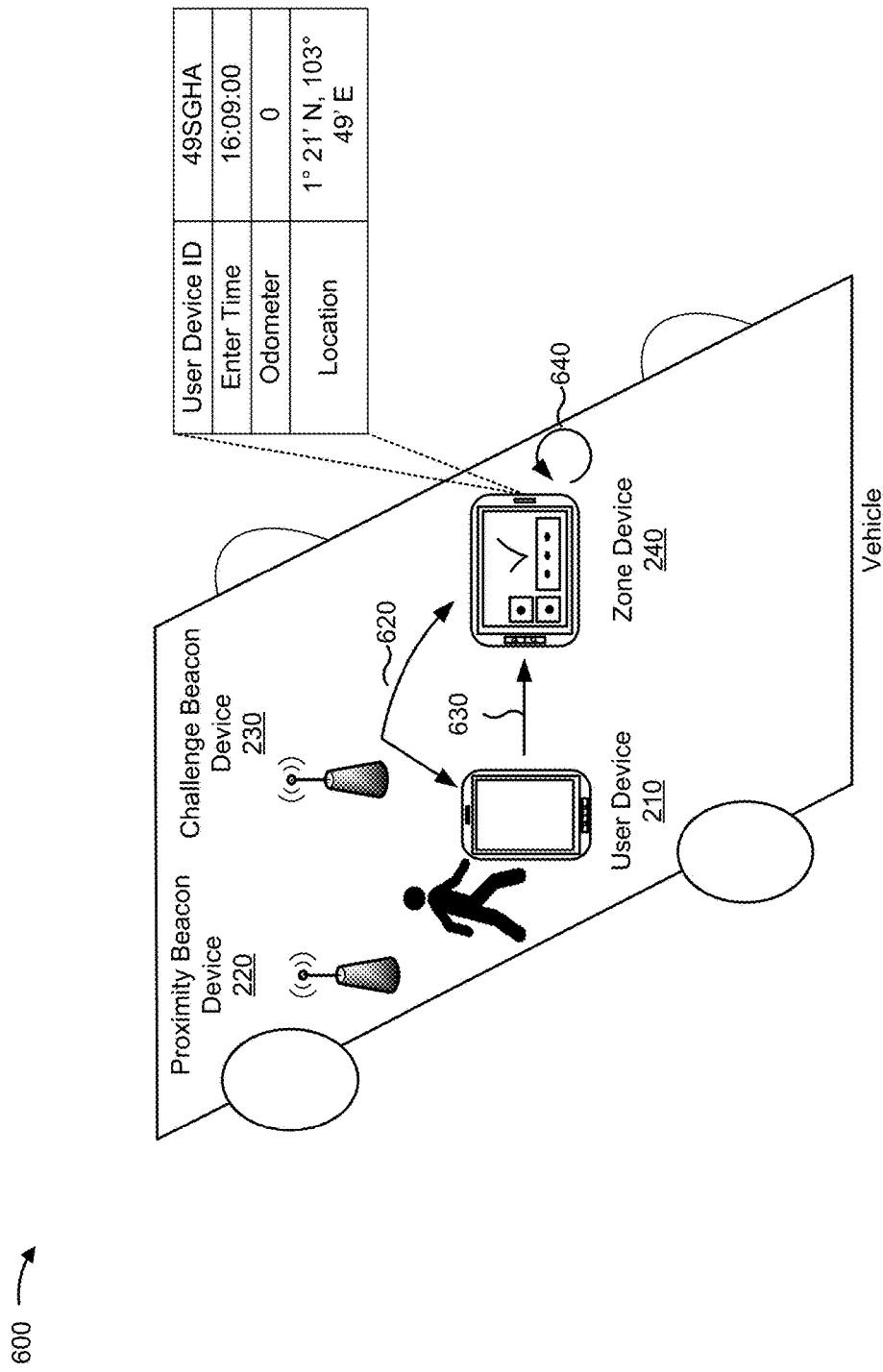
Figure 6C:
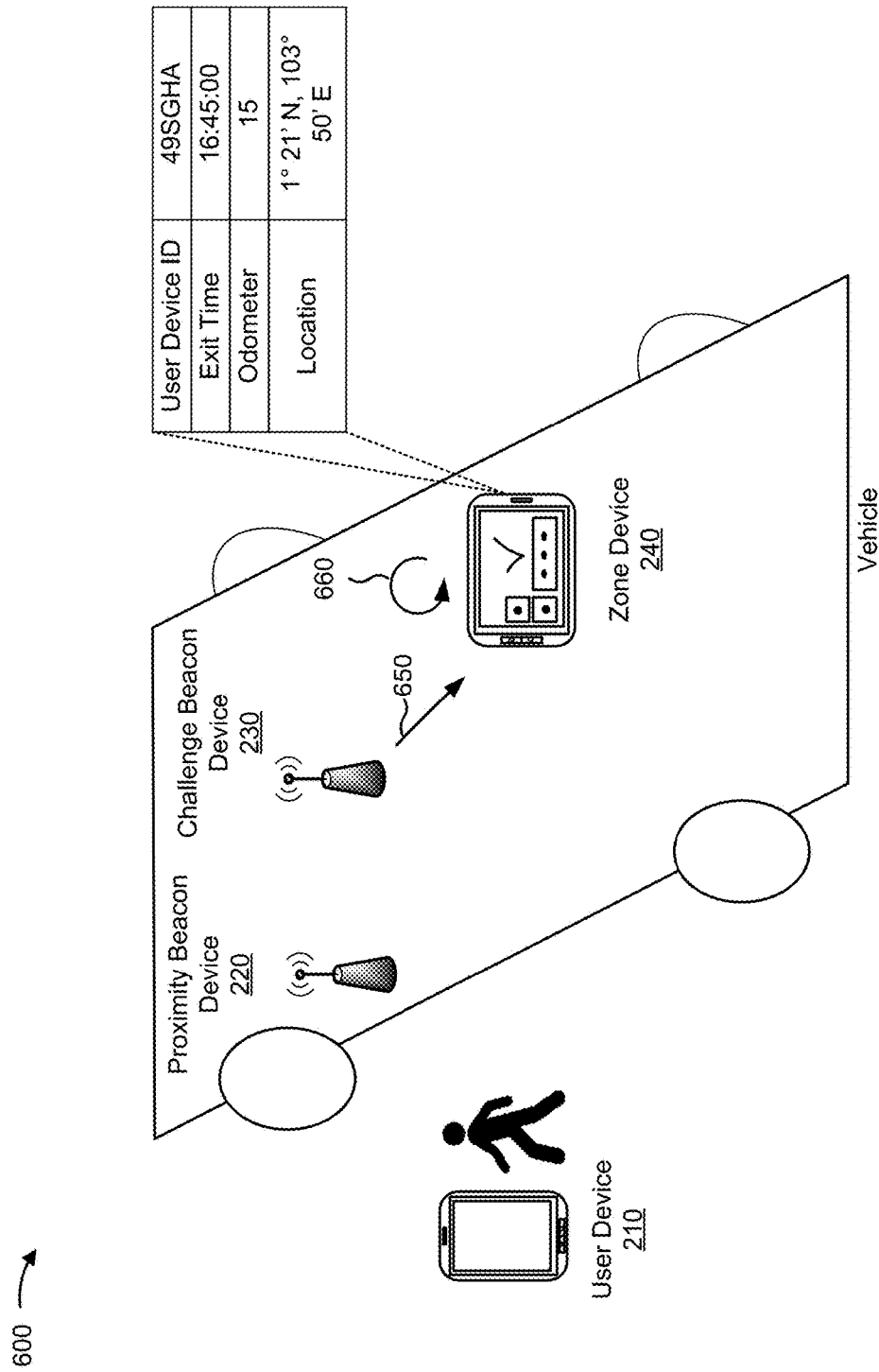

FIGS. 6A-6C are diagrams of an example implementation 600 relating to example process 400 shown in FIG. 4. FIGS. 6A-6C show an example of device identification using bandwidth efficient techniques.

As shown in FIG. 6A, assume that a user enters a transit station (e.g., a bus station). As shown by reference number 610, proximity beacon device 220 may provide, to user device 210, a proximity message, that may cause user device 210 to launch an identification application and/or activate a scan mode. As an example, assume that the user is commuting via a vehicle (e.g., a bus), and that a fare may be charged to an account of the user.

As shown in FIG. 6B, and by reference number 620, challenge beacon device 230 may broadcast, throughout an identification area (e.g., the vehicle), a challenge message that may be received by user device 210 and zone device 240. Assume that the challenge message includes a particular unique challenge identifier. As shown by reference number 630, user device 210 may provide, to zone device 240, a response message that includes the user device identifier (e.g., as an encrypted identifier). As shown by reference number 640, zone device 240 may determine the user device identifier (e.g., "49SGHA"), and may determine an event (e.g., that the user has entered the vehicle) associated with the user device identifier. As further shown, zone device 240 may correlate context information and the information that identifies the event and the user device identifier. As shown, zone device 240 may store context information, such as a time, an odometer reading, a location (e.g., GPS coordinates), and/or other context information (not shown). Assume that the user remains inside the vehicle for a particular amount of time. In this case, challenge beacon device 230 may provide additional challenge messages (e.g., including the same unique challenge identifier or different unique challenge identifiers), and user device 210 may provide additional response messages to zone device 240. In this way, zone device 240 may determine additional events that may indicate that user device 210 is inside the vehicle.

As shown in FIG. 6C, assume that the user exits the vehicle. As shown by reference number 650, challenge beacon device 230 may provide a challenge message to zone device 240. As shown, the user may exit the vehicle, and thus, user device 210 may fail to receive the challenge message and/or may fail to provide a response message to zone device 240. As shown by reference number 660, zone device 240 may determine an event, such as that user device 210 is no longer associated with the identification area (e.g., inside the vehicle). For example, zone device 240 may determine that user device 210 is no longer associated with the identification area based on not receiving a response message (or response messages) from user device 210. Alternatively, zone device 240 may determine that user device 210 is no longer associated with the identification area based on receiving a response message that includes a unique challenge identifier associated with another challenge beacon device 230 (not shown) associated with exiting the vehicle.

As further shown in FIG. 6C, zone device 240 may correlate the event and context information, such as an exit time, an updated odometer reading (e.g., indicating that the vehicle has traveled 15 miles since the user entered the vehicle), and an updated location (e.g., GPS coordinates associated with a location where the user exited the vehicle). In this way, zone device 240 may provide information, that identifies the event (or events), and context information to server device 250. Additionally, server device 250 may perform an action (e.g., charge a user account) based on the context information and information that identifies the event(s). For example, server device 250 may charge a fare based on the distance travelled by the vehicle, or the like.

As indicated above, FIGS. 6A-6C are provided merely as an example. Other examples are possible and may differ from what was described with regard to FIGS. 6A-6C.

Figure 7A:
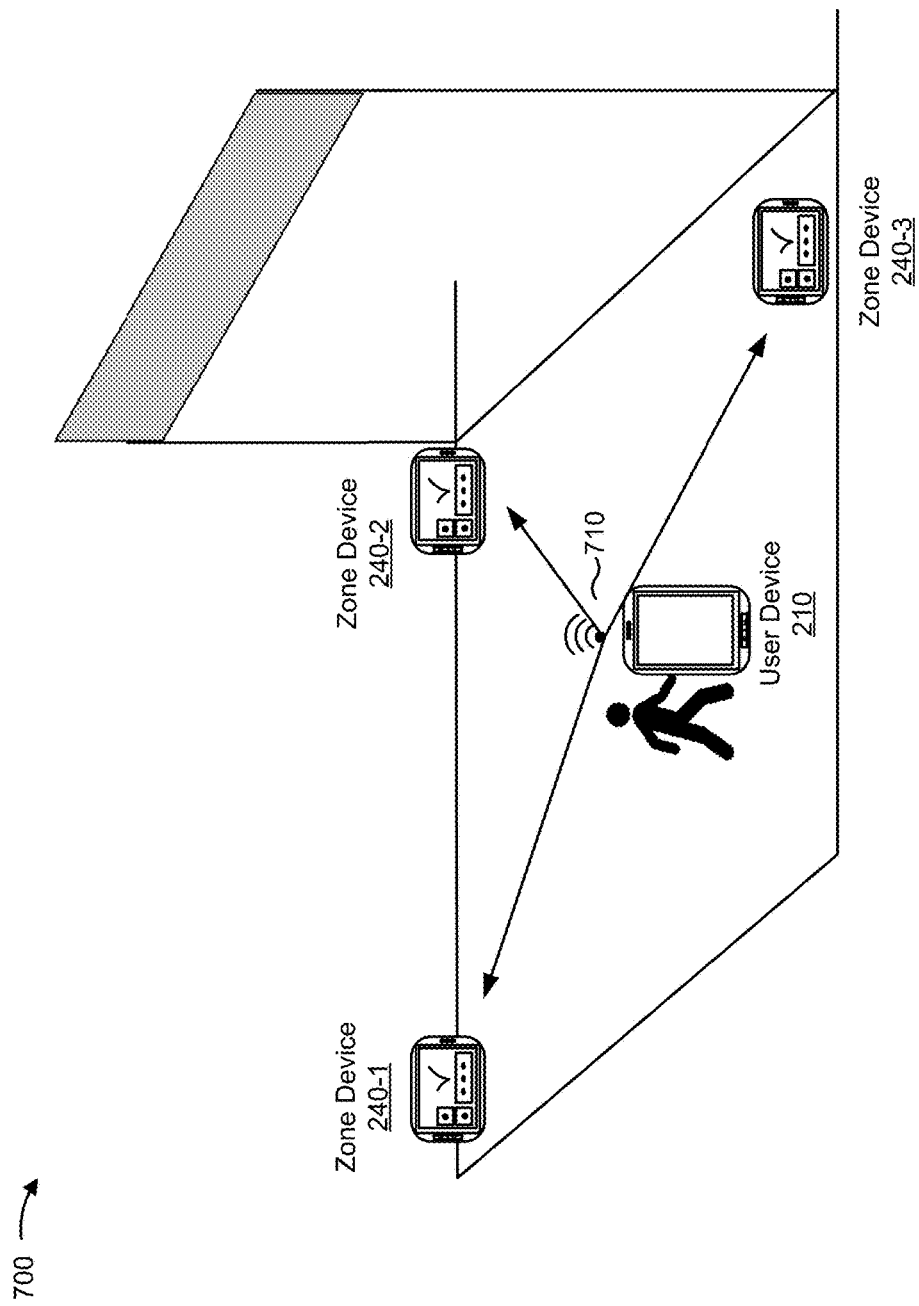
FIGS. 7A and 7B are diagrams of an example implementation relating to the example process shown in FIG. 4.
Figure 7B:
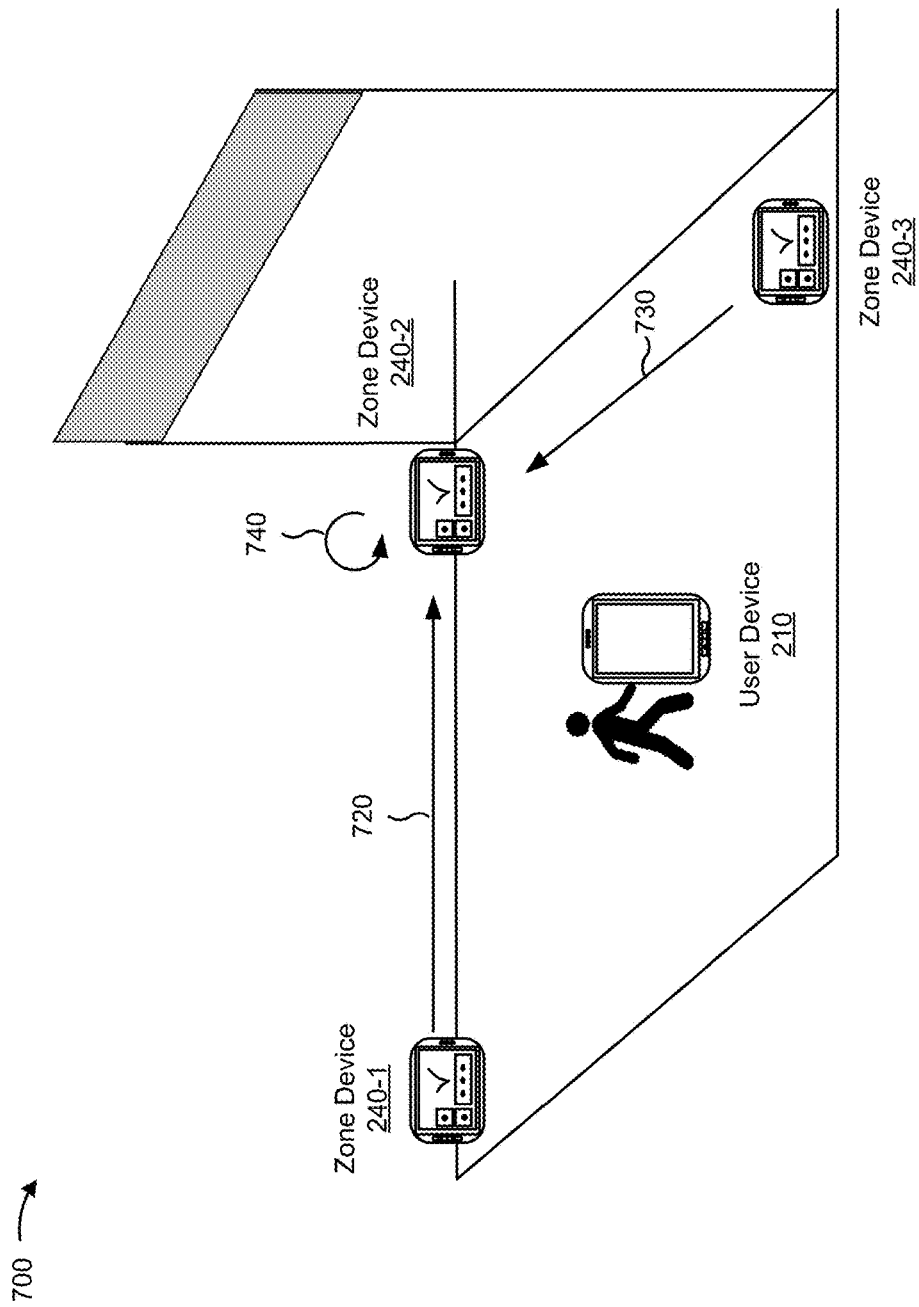

FIGS. 7A and 7B are diagrams of an example implementation 700 relating to example process 400 shown in FIG. 4. FIGS. 7A and 7B show an example of device identification using bandwidth efficient techniques.

As shown in FIG. 7A, assume that a user is associated with an identification area (e.g., is located within a transit station). As shown by reference number 710, user device 210 may broadcast a response message throughout the identification area (e.g., based on a challenge message received from challenge beacon device 230 (not shown)). As shown, the identification area may include multiple zone devices 240, which may each receive the response message. Assume that each zone device 240 determines a value associated with the response message. For example, each zone device 240 may measure an RSSI value associated with the response message.

As shown in FIG. 7B, and by reference number 720, zone device 240-1 may provide, to zone device 240-2, a message that includes a measured RSSI value associated with the response message. Additionally, as shown, zone device 240-3 may provide a message that includes a measured RSSI value associated with the response message. Zone device 240-2 may receive the measured RSSI values, and may perform a triangulation-based calculation using the measured RSSI values to determine a position, location, etc. of user device 210 in association with the identification area. Zone devices 240 may repeat the above process to more accurately determine a position of user device 210 in association with the identification area, thereby enabling a more accurate determination of an event or events.

As indicated above, FIGS. 7A and 7B are provided merely as an example. Other examples are possible and may differ from what was described with regard to FIGS. 7A and 7B.

Implementations described herein may enable a zone device to quickly identify a user device without requiring that the zone device establish a communication link with the user device, thereby conserving battery, processor, and/or memory resources of a user device. Additionally, implementations described herein may enable a user to be identified, without requiring that the user carry a dedicated device or perform a physical operation. Additionally, implementations described herein may enable a user to be identified quickly and without requiring that the user's progress be impeded. Additionally, implementations described herein may enable a user device to provide an encrypted user device identifier that may depend on a location and/or time, thereby increasing the security of the user device identifier. Thereby, implementations described herein may provide a convenient, and scalable solution for high traffic areas where user identification may be beneficial.

While some implementations described herein are described in terms of using BLE advertisement mode signaling, implementations described herein may be used in conjunction with other types of communication methods.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a first beacon device, a first message including a first identifier, the first identifier being associated with the first beacon device;

receive, from a user device, a second message including a second identifier, the second identifier being associated with the user device;
determine the second identifier based on the second message and the first identifier;
determine a first event associated with the second identifier based on the first identifier;
receive, from the user device, a third message including the second identifier and a third identifier,
the third identifier being associated with a second beacon device;
determine a second event associated with the second identifier based on the third message and the third identifier; and
provide, to another device, information that identifies the second identifier, the first event, and the second event,
an action being performed by the other device based on the information,
the action including at least one of:
charging an account associated with the user device, or
updating a profile associated with the user device.

2. The device of claim 1, where the second message is a wireless personal area network advertisement signal.

3. The device of claim 1, where the one or more processors are further to:
determine context information based on the first identifier; and
where the one or more processors, when determining the first event, are to:
determine the first event based on the context information.

4. The device of claim 1, where the device is a first device; and
where the one or more processors are further to:
determine a value associated with the first message;
receive, from a second device, another value associated with the first message,
the second device to determine the other value based on receiving the first message; and
where the one or more processors, when determining the first event, are to:
determine the first event based on the value and the other value.

5. The device of claim 1, where the one or more processors are further to:
identify an algorithm associated with the user device,
the user device to encrypt the second identifier using the algorithm; and
where the one or more processors, when determining the second identifier, are to:
determine the second identifier using the algorithm to decrypt the second identifier.

6. The device of claim 1, where the one or more processors are further to:
determine a location of the user device; and
where the one or more processors, when determining the first event, are to:
determine the first event based on the location.

7. A non-transitory computer-readable medium storing instructions, the instructions comprising:
one or more instructions that, when executed by one or more processors of a device, cause the one or more processors to:
receive, from a first beacon device, a first message including a first identifier;
receive, from a user device, a second message including a second identifier, the user device to provide the second message using wireless personal area network advertisement mode signaling;
determine the second identifier based on the second message and the first identifier;
determine a first event based on the second identifier;
receive, from the user device, a third message including the second identifier and a third identifier,
the third identifier being associated with a second beacon device;
determine a second event associated with the second identifier based on the third message and the third identifier; and
provide, to another device, information that identifies the second identifier, the first event, and the second event to cause an action to be performed,
the action including at least one of:
charging an account associated with the user device, or
updating a profile associated with the user device.

8. The non-transitory computer-readable medium of claim 7, where the one or more instructions, when executed by the one or more processors, further cause the one or more processors to:
determine a location of the user device in association with an identification area based on the second message; and
where the one or more instructions, that cause the one or more processors to determine the first event, cause the one or more processors to:
determine the first event based on the location.

9. The non-transitory computer-readable medium of claim 7, where the one or more instructions, when executed by the one or more processors, further cause the one or more processors to:
determine a velocity associated with a vehicle,
the first beacon device being associated with the vehicle; and
where the one or more instructions, that cause the one or more processors to determine the first event, cause the one or more processors to:
determine the first event based on the velocity.

10. The non-transitory computer-readable medium of claim 7, where the one or more instructions, when executed by the one or more processors, further cause the one or more processors to:
determine a plurality of user device identifiers associated with a plurality of user devices,
the plurality of user devices including the user device;
receive information that identifies a quantity of users in association with an identification area;
compare the quantity of users and the plurality of user device identifiers; and
provide information to a security device based on comparing the quantity of users and the plurality of user device identifiers.

11. The non-transitory computer-readable medium of claim 7, where the one or more instructions, when executed by the one or more processors, further cause the one or more processors to:
determine a first location of a vehicle based on the second message;
determine a second location of the vehicle based on the third message; and where the one or more instructions, that cause the one or more processors to determine the second event, cause the one or more processors to:
   determine the second event based on the first location and the second location.

12. The non-transitory computer-readable medium of claim 7, where the device is a first device; and
where the one or more instructions, when executed by the one or more processors, further cause the one or more processors to:
   determine a received signal strength value associated with the second message;
   receive, from a second device, information that identifies another received signal strength value associated with the second message,
      the second device to determine the other received signal strength value based on the second message; and
   where the one or more instructions, that cause the one or more processors to determine the first event, cause the one or more processors to:
      determine the first event based on the received signal strength value and the other received signal strength value.

13. The non-transitory computer-readable medium of claim 7, where the one or more instructions, when executed by the one or more processors, further cause the one or more processors to:
   determine a sequence of the first event and the second event; and
   where the one or more instructions, that cause the one or more processors to provide the information, cause the one or more processors to:
      provide the information based on the sequence of the first event and the second event.

14. A method, comprising:
   receiving, by a device and from a first beacon device, a first message;
   activating, by the device, a scan mode based on the first message;
   receiving, by the device and from a second beacon device, a second message based on the scan mode;
   determining, by the device, a first identifier based on the second message,
      the first identifier being associated with the second beacon device;
   providing, by the device and to another device, a third message including a second identifier,
      the second identifier being associated with the device,
      the other device to determine the second identifier based on the first identifier, and
      a first event being determined based on the second identifier,
      the device to provide the third message to the other device without establishing a communication link with the other device; and
   providing, by the device and to the other device, a fourth message including the second identifier and a third identifier,
      the third identifier being associated with a third beacon device,
      a second event being determined based on the third identifier, and
      an action being performed based on the first event and the second event,
         the action including at least one of:
            charging an account associated with the device, or
            updating a profile associated with the device.

15. The method of claim 14, further comprising:
   encrypting the second identifier based on the first identifier to generate an encrypted identifier; and
   where providing the third message comprises:
      providing the third message including the encrypted identifier.

16. The method of claim 14, further comprising:
   determining that a value associated with the second message satisfies a threshold value; and
   where providing the third message comprises:
      providing the third message based on the value satisfying the threshold value.

17. The method of claim 14, further comprising:
   providing a fifth message including the second identifier,
      a first time interval, between the third message and the fourth message, being different than a second time interval, between the fourth message and the fifth message, to reduce message collisions.

18. The method of claim 14, further comprising:
   determining that a value associated with the first message satisfies a threshold value; and
   where activating the scan mode comprises:
      activating the scan mode based on the value satisfying the threshold value.

19. The method of claim 14, further comprising:
   providing a plurality of response messages for a threshold amount of time based on the second message,
      the plurality of response messages including the third message.

20. The device of claim 1, where the third message is received without establishing a communication link with the user device.

* * * * *